No. 785,550. PATENTED MAR. 21, 1905.
C. W. HESS & J. F. MATTHEWS.
SELF CLOSING GATE.
APPLICATION FILED MAY 19, 1904.
2 SHEETS—SHEET 1.
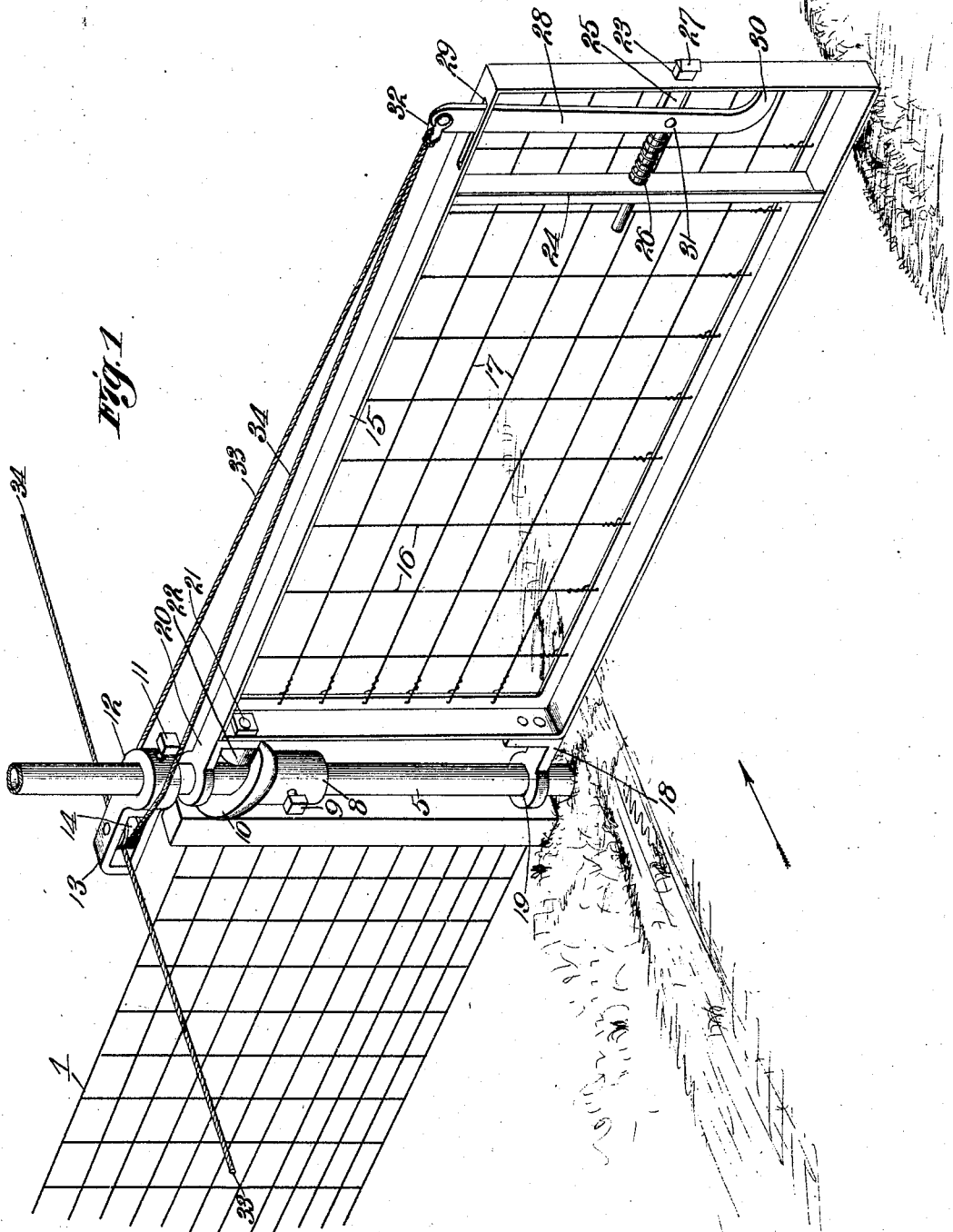

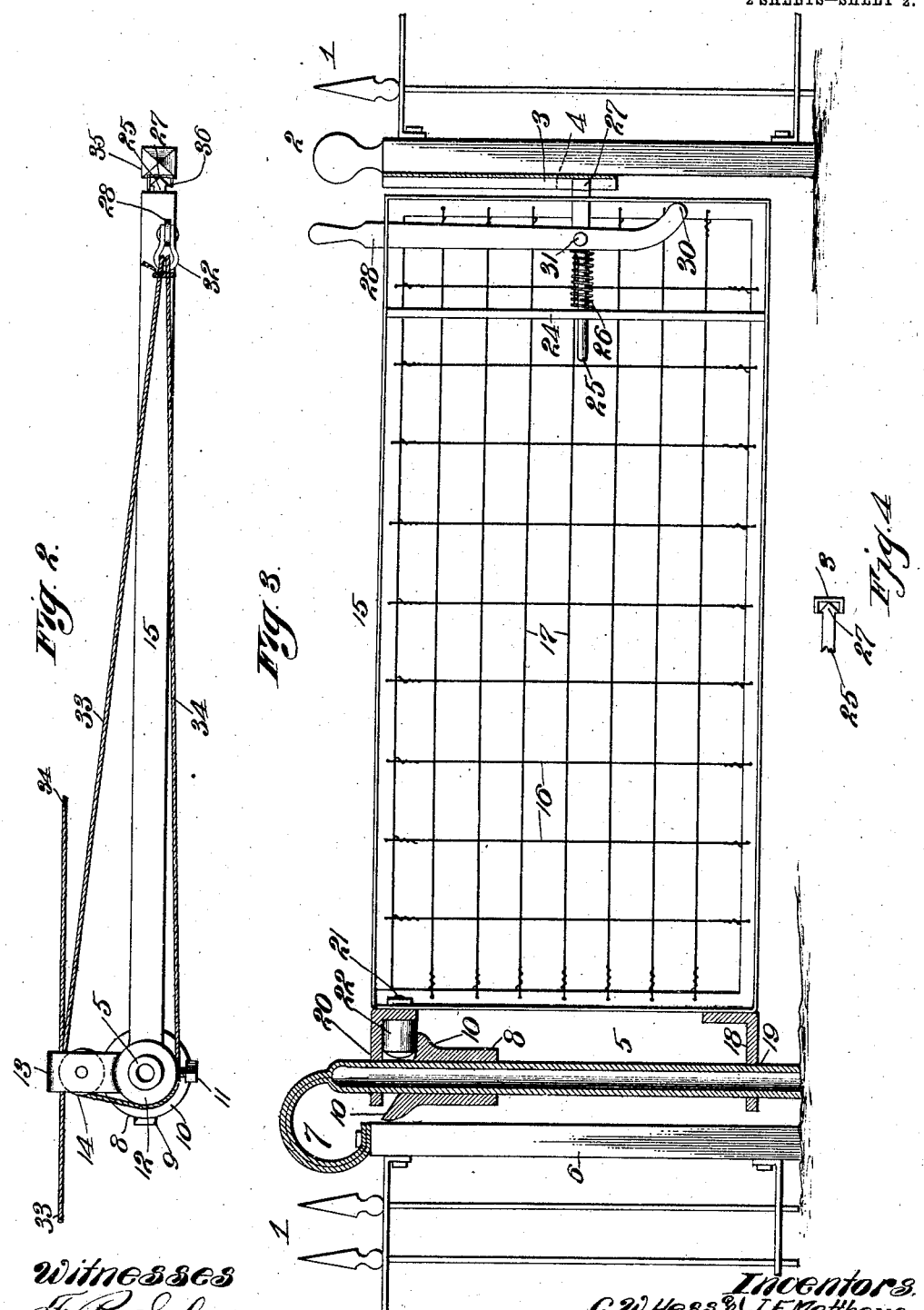

No. 785,550. Patented March 21, 1905.

UNITED STATES PATENT OFFICE.

CHARLES WILLIAM HESS AND JAMES FILLMORE MATTHEWS, OF ELRENO, OKLAHOMA TERRITORY.

SELF-CLOSING GATE.

SPECIFICATION forming part of Letters Patent No. 785,550, dated March 21, 1905.

Application filed May 19, 1904. Serial No. 208,657.

*To all whom it may concern:*

Be it known that we, CHARLES WILLIAM HESS and JAMES FILLMORE MATTHEWS, citizens of the United States, residing at Elreno, in the county of Canadian and Territory of Oklahoma, have invented certain new and useful Improvements in Self-Closing Gates, of which the following is a specification.

This invention relates to self-closing gates of that type which can be opened by the driver of a vehicle or by a person on horseback without dismounting; and our object is to produce a gate of this character which will automatically close if unobstructed and which can be vertically adjusted to accommodate snowfalls of varying depth.

A further object is to produce a gate of this character which is of simple, durable, and inexpensive construction.

To these ends the invention consists in certain novel and peculiar features of construction and combinations of parts, as hereinafter described and claimed, and in order that it may be fully understood reference is to be had to the accompanying drawings, in which—

Figure 1 is a perspective view of a gate embodying our invention. Fig. 2 is a top plan view of the same when open. Fig. 3 is a view partly in side elevation and partly in central vertical section, said view showing the gate as forming a part of a driveway-fence. Fig. 4 is a plan view of the latch mechanism of the gate.

In the said drawings, where like reference-numerals refer to corresponding parts in all the figures, 1 designates a fence of any suitable or preferred type, the latch-post 2, having secured to its roadway side a catch 3 in the form of a vertical channel-iron or its equivalent, and at the same side of the roadway as but at opposite sides of the hinge-post are latch-posts 35, (one only appearing; see Fig. 2,) having catches 36 substantially similar to catch 3.

For farm-yard fences and fences paralleling railroad-tracks the catch 3 should be prolonged upward a considerable distance, as indicated in Fig. 3, for a purpose which hereinafter appears. For fences of the character shown in Fig. 3, however, said catch preferably will extend to about the dotted line 4. The same is true with regard to catches 36.

5 designates the hinge-post, the same being of cylindrical and preferably hollow construction. For farm-yard fences, railroad division-fences, ranch-fences, and the like said hinge-post will preferably project a considerable distance above the top of the fence, as shown in Fig. 1. For driveway and other city fences the hinge-post will be of about the same height as the latch-post and will also be preferably connected in any suitable manner to the contiguous end of post 6 of the fence, the connection shown being an arched connection, as at 7.

8 designates a collar secured at the desired point of vertical adjustment on the hinge-post by set-screw 9 or its equivalent, the upper end of said collar being enlarged, by preference, to form a cam-trackway 10, said trackway rising from its roadway side toward the opposite side of the post.

11 designates a set-screw securing at the desired point of vertical adjustment upon the hinge-post and above the cam-faced collar a collar 12, having a loop 13 overhanging the contiguous portion of the fence, and journaled in said loop for rotation in a horizontal plane is a pulley 14.

The gate 15 may be of any suitable type; but preferably its frame will be formed for farmyard and analogous purposes by bending an angle-iron to rectangular form and connecting the upper and lower sides by vertical wires 16 and the ends by horizontal wires 17. Secured to the lower hinge-corner of the gate is an angle-bracket 18, having an opening 19, through which the hinge-post extends, and a similar angle-bracket 20 engages the hinge-post and is secured to the upper corner of the gate. A horizontal bolt or stub-shaft 21 is secured to the upper corner of the gate and bracket 20 parallel with and below the horizontal arm of the latter, and journaled on said bolt or stub-shaft is a roller 22, which sustains the hinged end of the gate by resting upon the cam-faced collar normally at the lowest point of the cam-face.

Extending slidingly through an opening 23 in the latch-post end of the gate and also through a vertical bar 24, connecting the top and bottom of the gate at a suitable point, is a reciprocatory latch-bar 25, normally held advanced by the pressure of spring 26 thereon and bearing at its rear end against bar 24. The front end of the latch-bar terminates in a V-shaped or double-bevel hook 27, so that said hook may strike and be forced back by the catch or either of the catches 36, the spring immediately readvancing the latch to effect its reliable automatic engagement with the channel of the catch. For driveway or other city fences and also for railway-fences by preference this latch may be grasped to withdraw it preliminary to opening and closing the gate; but for farmyard and analogous gates we provide the following means for accomplishing such purpose: 28 designates a lever extending down through a slot 29 in the top of the gate and having its lower end bent forward, by preference, as at 30, and bearing against the front end bar of the gate, said lever being pivoted, as at 31, to the latch-bar, so that movement imparted to the upper end of the lever toward the hinge-post shall result in the latter fulcruming at the lower end against said end bar and withdrawing the latch from engagement with the catch, the spring immediately reprojecting the latch when the overcoming pressure is removed from the lever. Attached directly to the upper end of the lever or to a clevis 32, pivoted thereto, are cables 33 and 34, said cables extending in a substantially horizontal plane to and beyond opposite sides of collar 12 and in opposite directions through the loop 13 thereof, incidentally engaging the grooved roller 14, and the ends of the cables are adapted to be suitably supported within convenient reach of the driver of a vehicle or a person on horseback approaching the gate from either side, such supports not being shown because of well-known construction.

Assuming that the vehicle is approaching the gate in the direction indicated by the arrow, Fig. 1, the driver pulls upon the proximate cable 33. The first two or three inches of movement of said cable results in unlatching the gate and the next eight or ten inches in swinging the gate fully open—that is, from the position shown in Fig. 1 transversely of the roadway to the position shown in Fig. 2, parallel with the roadway—the gate opening away from the operator and rising at the same time, because of the travel of roller 22 upward upon the cam-face of collar 8. As the opening movement of the gate terminates the latch engages the catch 36 in its path and locks the gate open. Without stopping the vehicle is driven through the gateway and in passing the cable 24 is pulled to withdraw the latch from the catch and hold it withdrawn temporarily or until the gate begins its closing movement, such action occurring because the weight of the gate is imposed, through the instrumentality of roller 22, upon the cam-faced collar. As the gate resumes its original position its latch is forced back by the catch, as hereinbefore explained, and is immediately reprojected into the catch by the spring 27, which offers a sufficient resistance to prevent the gate opening under wind or other pressure not applied longitudinally thereon.

A gate of the character shown in Fig. 1 can be vertically adjusted above the snow-level, so that it will open and close with perfect freedom, this vertical adjustment being effected by loosening set-screws 9 and 11, raising collars 8 and 12 and incidentally the gate, and resecuring said collars in their new positions by means of the set-screws. With a gate adapted for vertical adjustment it will of course be desirable to use a latch-post having an upwardly-prolonged catch in order that the reciprocatory latch of the gate may coöperate therewith when occupying its elevated position.

A gate of the character illustrated in Fig. 1, but without the cables for operating the latch, will be found of special advantage on fences separating two fields from each other and a railroad-track between them, for the reason that it is absolutely reliable in its closing action, but makes it incumbent on the driver to hold, latch, or prop the gate open before driving through, so that should it be left open and stock be killed by a train it would be a conclusive presumption that the railroad company was not responsible.

From the above description it will be apparent that we have produced a self-closing gate of the character described and which possesses the features of advantage enumerated as desirable in the statement of invention, and while we have illustrated and described the preferred embodiments of the same it is to be understood that it is susceptible of modification as regards its form, proportion, detail construction, and organization without departing from its essential spirit and scope or sacrificing any of its advantages.

Having thus described the invention, what we claim as new, and desire to secure by Letters Patent, is—

1. The combination of a latch-post having a channeled catch at its roadway side; a hinge-post at the opposite side of the roadway; a vertically-movable collar on the hinge-post provided with an upwardly-disposed cam-face pitched downwardly toward the roadway; a gate pivoted for vertical movement on the hinge-post and provided with a roller resting upon the cam-face of said collar; and a spring-actuated reciprocatory latch carried by the gate and provided with a head beveled from each side to a point and normally engaging the catch.

2. The combination of a latch-post having a vertically-channeled catch at its roadway side;

a hinge-post at the opposite side of the roadway; a pair of vertically-movable collars on the hinge-post, one of them provided with an upwardly-disposed cam-face pitched downwardly toward the roadway; a gate having brackets pivoted on the post, one of them below the cam-face collar and the other between said collar and the companion collar; a horizontally-disposed pulley supported from the last-named collar rearward of the hinge-post; a spring-actuated reciprocatory latch carried by the gate and terminating in a beveled head; a lever pivoted to said latch and fulcrumed at its lower end against the gate; and cables extending around said pulley from opposite sides and secured at one end to the lever at the opposite side of the same from said fulcrum-point.

3. The combination of a latch-post having a vertically-channeled catch at its roadway side; a hinge-post at the opposite side of the roadway; a pair of vertically-movable collars on the hinge-post, one of them provided with an upwardly-disposed cam-face pitched downwardly toward the roadway; a gate having brackets pivoted on the post, one of them below the cam-faced collar and the other between said collar and the companion collar; a horizontally-disposed pulley supported from the last-named collar rearward of the hinge-post; a spring-actuated reciprocatory latch carried by the gate and terminating in a beveled head; a lever pivoted to said latch and fulcrumed at its lower end against the gate; cables extending around said pulley from opposite sides and secured at one end to the lever at the opposite side of the same from said fulcrum-point; and posts at opposite sides of and at the same side of the roadway as the hinge-post and provided with vertically-channeled catches for engagement at times by the latch.

In testimony whereof we affix our signatures in the presence of two witnesses.

CHARLES WILLIAM HESS.
JAMES FILLMORE MATTHEWS.

Witnesses:
E. J. SIMPSON,
ALI KEMP.